United States Patent [19]
Okuyama et al.

[11] Patent Number: 6,157,650
[45] Date of Patent: Dec. 5, 2000

[54] METHOD AND APPARATUS FOR CONNECTING NETWORK

[75] Inventors: Takehiko Okuyama; Jun Okazaki; Hiroaki Kobayashi, all of Kanagawa-ken, Japan

[73] Assignee: Kabushiki Kaisha Toshiba, Kawasaki, Japan

[21] Appl. No.: 08/972,686

[22] Filed: Nov. 18, 1997

[30] Foreign Application Priority Data

Nov. 20, 1996 [JP] Japan .................................. 8-309656

[51] Int. Cl.[7] .................................................. H04L 12/46
[52] U.S. Cl. ......................... 370/401; 370/466; 370/467
[58] Field of Search ................................. 370/466, 467, 370/463, 489, 490, 485, 486, 487, 468, 420, 421, 419, 401, 402, 545; 709/249

[56] References Cited

U.S. PATENT DOCUMENTS

| | | | |
|---|---|---|---|
| 5,463,623 | 10/1995 | Grimes et al. | 370/466 |
| 5,504,757 | 4/1996 | Cook et al. | 370/468 |
| 5,533,018 | 7/1996 | De Jager et al. | 370/352 |
| 5,600,633 | 2/1997 | Jaisingh et al. | 370/277 |
| 5,610,910 | 3/1997 | Focsaneanu et al. | 370/351 |
| 5,640,386 | 6/1997 | Wiedeman | 370/320 |
| 5,729,544 | 3/1998 | Lev et al. | 370/352 |
| 5,796,742 | 8/1998 | Klotzbach et al. | 370/466 |
| 6,005,861 | 12/1999 | Humpleman | 370/352 |
| 6,014,381 | 1/2000 | Troxel et al. | 370/395 |
| 6,026,086 | 2/2000 | Lancelot et al. | 370/353 |

FOREIGN PATENT DOCUMENTS

| | | |
|---|---|---|
| 0 689 327 A2 | 12/1995 | European Pat. Off. . |
| 61-136151 | 6/1986 | Japan . |
| 6-132998 | 5/1994 | Japan . |
| 9-093207 | 4/1997 | Japan . |
| 2 171 880 | 9/1986 | United Kingdom . |

OTHER PUBLICATIONS

R.H.J. Bloks, "The IEEE–1394 High Speed Serial Bus", Phillips Journal of Research, Vol. 50, No. 1/2, 1996, pp. 209–216.

Scott Smyers, "Comparison of Three New Interfaces, searching design comcept for post–SCSI", Nikkei Electronics, 1994.7.4, pp. 152–163, (No. 612).

Patent Abstracts of Japan, vol. 14, No. 166 (E–0911) Mar. 30, 1990 and JP 02021750 A (Mitsubishi Electric Corp.) Jan. 24, 1990.

Patent Abstract of Japan, vol. 6, No. 119 (E–116), Jul. 3, 1982 and JP 57 046556 A (Hitachi, Ltd) Mar. 17, 1982.

Patent Abstracts of Japan, Apr. 4, 1997, JP 09093207 A (Cannon Inc.).

*Primary Examiner*—Seema S. Rao
*Attorney, Agent, or Firm*—Pillsbury Madison & Sutro LLP

[57] ABSTRACT

Node c, which is connected by two different protocols, that is, the IEEE 1394 as a line transmission system and the radio transmission system, becomes the bus manager through bus arbitration, and allocates ID to each of nodes a to d in the network. In data transmission, the transmission rate informing part in node c informs each of nodes a to c of the maximum rate in the radio transmission system. The communication procedure converting part and the signaling type converting part in node c convert into the communication procedure and the signaling type suitable for the radio transmission system, and transmit the converted data to node d in the radio network through a communicating part for transmission system B, thereby enabling real time data transmission.

22 Claims, 7 Drawing Sheets

METHOD AND APPARATUS FOR CONNECTING NETWORK

BACKGROUND OF THE INVENTION

1. Field of the Invention

The present invention relates to a method and apparatus for connecting networks suitable for enabling signal transmission even when the network system is configured between equipment connected with a line transmission system such as IEEE 1394, which is capable of an isochronous transmission of signals from a plurality of equipment, and equipment connected with a radio transmission system, different from the former system.

2. Related Art Statement

Recently, digital processing of images has been discussed. Generally, digitization of video signals generates a large amount of information, and transmitting or recording this information without compressing it is difficult because of transmission speed, cost or the like. Consequently, in transmitting or recording video signals, some technique to compress images is indispensable, and various plans for the standardization of techniques have been discussed. For animations, the MPEG (Moving Picture Experts Group) system has become standardized.

Especially, the MPEG2 system is most widely used as a standardized system for image compressing, and it has been adopted for digital broadcasting in the United States and Europe. Decoders corresponding to this MPEG standard as merchandise have been supplied as the MPEG decode board and mounted on computers and the like.

With the improvement in image compressing techniques, development in equipment for the digital image has also progressed. Not only have products like the digital VTR been introduced but other merchandise like the decoder for digital broadcasting (digital set top box), the digital video disc player (hereinafter referred to as DVD) and the like have been developed.

As digitization reduces degradation in transmission and recording of images, it advantageously regenerates images in high quality. Considering this advantage, a preferable configuration for each piece of digital video equipment would be that it have a digital interface which enables not only the conventional analogue inputting/outputting but also the inputting/outputting of digital signals as they are. With the digital interface provided, video data can be dealt with simply as digital data. Mutual conversion becomes possible not only for video equipment, but also for computers, enabling data transmission.

For apparatus provided with digital interface, in order to enable mutual data transfer with all the digital video equipment and computers, adoption of a unified interface system has been considered. To make it usable not only for digital video equipment but also for the computer system, the adoption of the standards of SCSI or RS232 is possible, for example. However, since the transmission rate of SCSI or RS232 is extremely low, it is impossible to transmit video data which require a transmission rate over several Mbps (bit/second). Besides, video data, unlike computer data, need to be transmitted periodically (also called isochronous transmission) in real time. These interface systems cannot be adopted for video transmission.

This being the case, at present, a high-speed interface system suitable for video data is under consideration by the council of digital interface VTR and at R4.1 of E1A, a U.S. council of TV (Advanced TV) decoder. Particularly, the IEEE (Institute of Electrical and Electronics Engineers) 1394 system, which has the isochronous transfer (also called synchronous transfer) function, is being adopted as the post SCSI system.

On this IEEE 1394 system, the 1394 Trade Association (also called 1394TA) has taken a leading part in the work to standardize and extend the system. This transmitting system, enables, at the same time, isochronous communication and is especially effective for video transmission. Consequently, AV apparatus manufacturers also participate in the standardizing work positively.

Such anticipated IEEE 1394 system is described in detail on pages 152 to 163 under the title of 'Comparison of Three New Interfaces, searching design concept for post-SCSI' of Nikkei Electronics 1994. 7. 4 (No. 612) (Reference 1). As reported on and after page 161 of the article, the basic use of the IEEE 1394 is for computers, but because it provides the isochronous transfer function provided, this system is also more effective for video data than other interface systems. Data of animation or sound are transferred by this system periodically without fail, and regenerated data never become strained.

The IEEE 1394 also has a function to set topology automatically (refer to pages 155 to 159 under the title of 'Automatic Setting of Topology' of Reference 1). IEEE 1394 resets the following; the connection of devices, confirmation of connection status of each device at non-connected time or at the time of power-source-throwing-in, setting of membership among devices and ID setting of each device. That is, in contrast to the topology of SCSI which can be only daisy-chained, the IEEE 1394's can also form a tree configuration to connect a plurality of devices.

Suppose the IEEE 1394, which is particularly effective for video transmission as described above, is standardized and put to practical use, it is possible to configure a network connection of a plurality of devices connected by a transmission configuration such as IEEE 1394, and different transmission configuration to form a network system. In other words, it would be a network system configured by connecting two different protocols.

In such a network system, if one side is a plurality of devices connected in the IEEE 1394 transmission configuration, to the other side, a plurality of devices are connected in another transmission configuration of a different protocol. In this case, in order to connect two different protocols, one device out of the plurality of devices must be connected by two different protocols. That is, the device to be connected in such a way is required to perform signal transmission in both protocols.

However, ordinary connecting devices are not provided with such a function for performing signal transmission in both protocols. In brief, even though network connection is done, real time signal transmission to both sides is impossible.

For example, in the IEEE 1394, performing arbitration, by using the automatic setting function of topology, instantly determines the membership among various devices; out of a plurality of connected devices, one becomes parent and other devices become children. At this time, if a device which is connected by a different protocol is the parent device on the IEEE 1394 side, the parent device and devices connected by the other protocol are connected by a transmission configuration other than the IEEE 1394.

Assume that the radio system protocol that is adopted as a transmission system is something other than IEEE 1394. While, in the IEEE 1394, the high-speed real time transmission of animation data is possible at the maximum transmission capability of 100–400 Mbps, the transmission capability of the radio transmission system is extremely low, a mere several Mbps. Consequently, while real time data transmission is possible with the devices connected in the IEEE 1394, real time data transmission from the parent device to other devices through radio system protocol is impossible because of the differences in transmission capability and in the packet size for transmission.

Further, as described above, in addition to the difference in protocols on both sides when the devices are connected in different transmission configuration on each side, the controlling method to control the node ID (identification number allocated to each device) also differs.

For these reasons, ordinary methods of and apparatus for connecting networks are incapable of two-way real time transmission of data as they are. When a network is configured by connecting the IEEE 1394 (line transmission system) with the radio transmission system of a different protocol, there are differences in protocol on both sides, as well as differences in the methods to control the node ID, and differences in the packet size at the time of data transmission. Thus, there has been a problem for ordinary methods and apparatus for connecting networks, because that a network system using the IEEE 1394 and the radio transmission system cannot be configured.

OBJECTS AND SUMMARY OF THE INVENTION

An object of the present invention is to provide an apparatus for connecting networks, which enables two-way real time data transmission even when a network system is configured between a plurality of devices connected in the IEEE 1394, a line transmission system, and a plurality of devices connected in the radio transmission system of a different protocol.

Another object of the present invention is to provide a method of connecting networks, which makes configuration of a network bus possible to enable two-way real time data transmission even when a network system is configured by connecting a plurality of devices connected by two different protocols of the IEEE 1394 (line transmission system) and the radio transmission system respectively.

According to the present invention, there is provided an apparatus for connecting networks comprising a communicating means which is able to communicate in either protocol of a first and second transmission systems whose protocols are different; a communication capability informing means for informing a device connected with at least one of said first and second transmission systems that communication is possible with a device connected with the other transmission system; a transmission rate informing means for informing a device connected with the other transmission system of the transmission rate based on at least one of said first and second transmission systems; a communication procedure converting means for converting the communication procedure based on at least one of said first and second transmission systems into the communication procedure based on the other transmission system; and a signaling type converting means for converting the signaling type based on at least one of said first and second transmission systems into the signaling type based on the other transmission system.

Other features and advantages of the present invention will become clear from the following description.

DETAILED DESCRIPTION OF THE PREFERRED EMBODIMENTS

Figure 1:
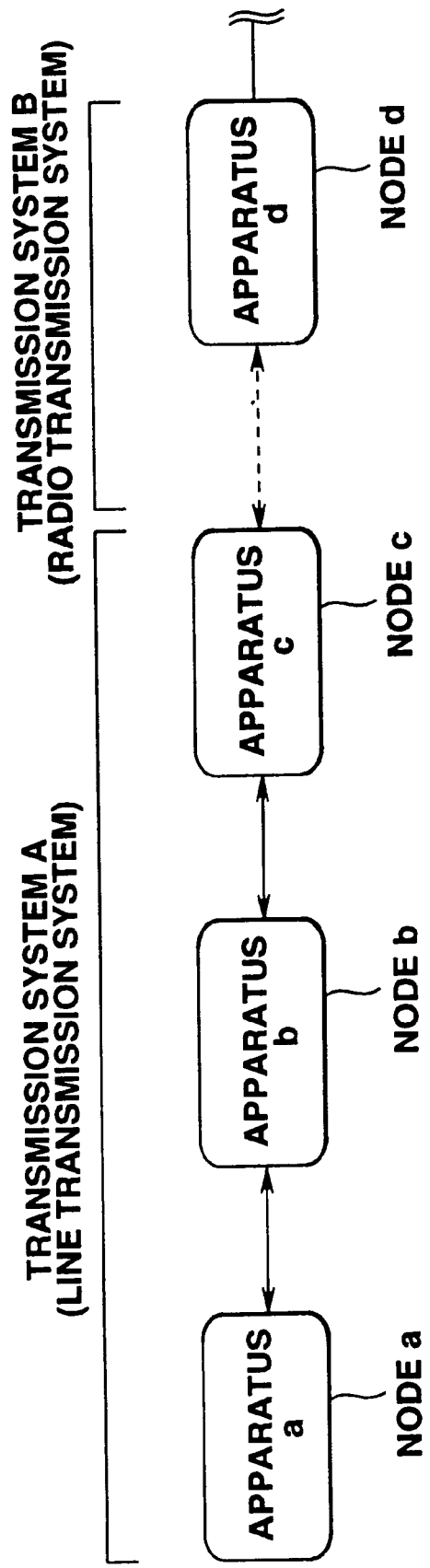
FIG. 1 is a block diagram of a network system configured by incorporating an apparatus for connecting networks according to the present invention.
Figure 2:
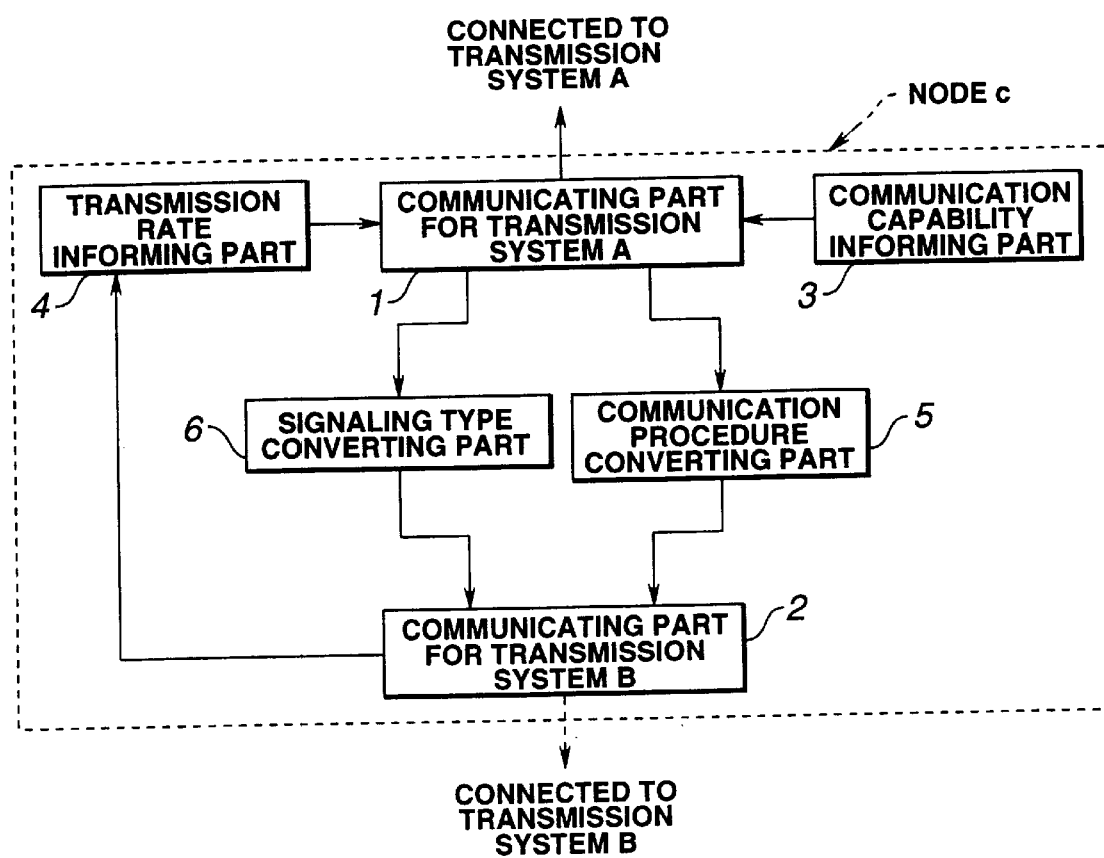
FIG. 2 is a block diagram of an embodiment of an apparatus for connecting networks according to the present invention.
Figure 3:
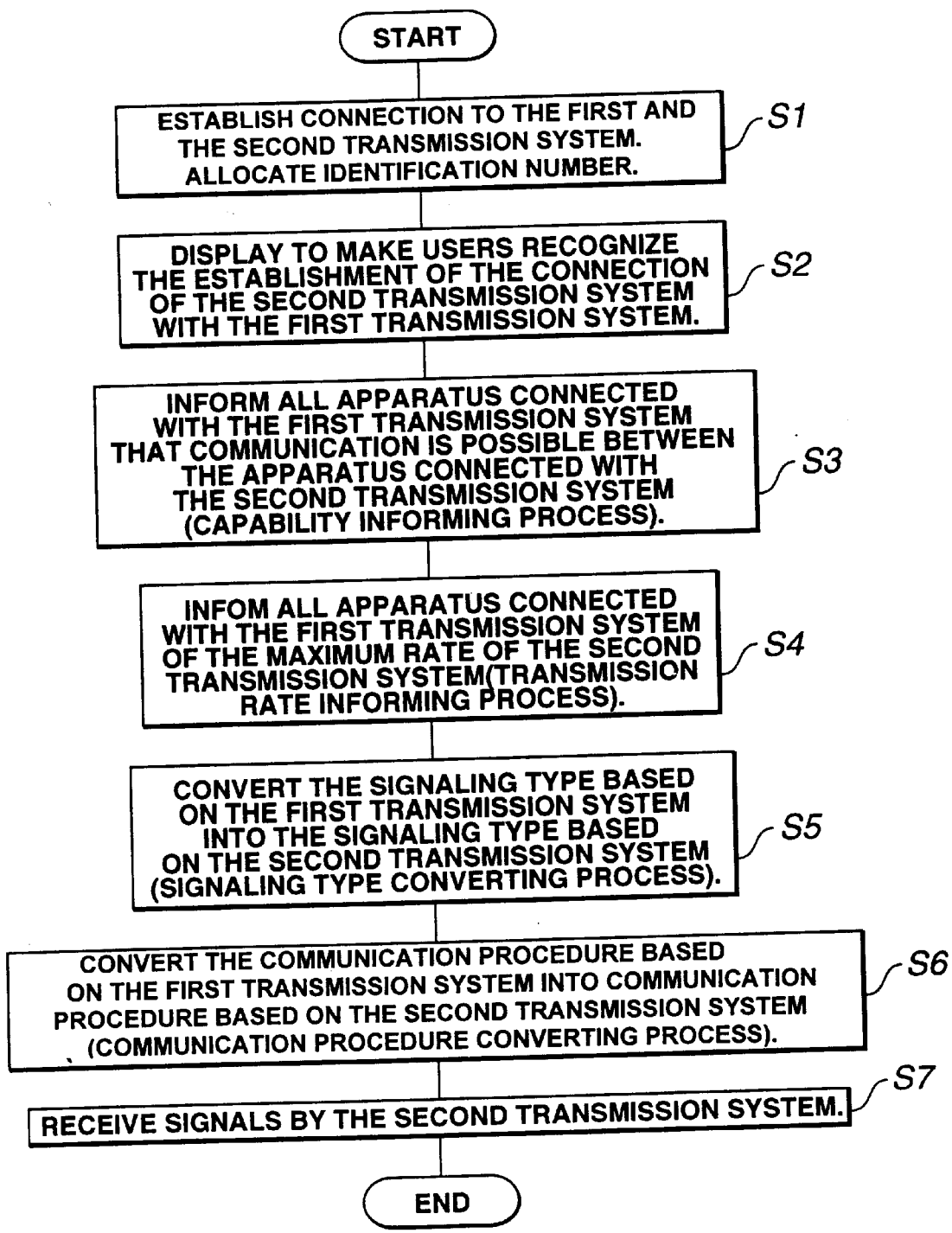
FIG. 3 is a flow chart showing a procedure to connect networks by using an apparatus for connecting networks shown in FIG. 2.

FIGS. 1 to 3 illustrate an apparatus for connecting networks, which is configured in accordance with an embodiment of the present invention. FIG. 1 is a block diagram of a system showing an example of connecting network systems with the incorporated apparatus. FIG. 2 is a block diagram illustrating a concrete configuration of an apparatus for connecting networks. FIG. 3 is a flow chart which illustrates an example of control operation of the apparatus. As for a concrete example of two different protocols, embodiments of the present invention are described as follows; one transmission system, the IEEE 1394 network of the IEEE 1394 Standard, is employed as line transmission system, and the employed for the other transmission system is the radio transmission network, such as IrDA (infrared transmission).

As shown in FIG. 1, the transmission system A, being a line transmission configuration, is the IEEE 1394 network to which a plurality of devices are connected. The devices connected are, for example, device a, device b, and device c. Each of these devices is provided with a respective node which is required for the device to execute communication functions in the IEEE 1394 system. Consequently, in the following description, the devices with nodes of the IEEE 1394 will be described as follows; device a will be described as node a, device b as node b, and the device c as node c.

The transmission system B, being a radio transmission configuration, is the infrared transmission network such as IrDA. To the infrared transmission network, node c, which is connected to the IEEE 1394 network, and the device d are connected. Although not shown in the figures, other devices may be connected to it. Device d is provided with a node which is necessary to make the device execute the functions required for the infrared transmission system. Similarly, the device with the node of the infrared transmission system, device d, will be described as node d.

Therefore, when network connection is done with two different protocols, as shown in the figure, node c is configured to be connected with both the transmission system A and the transmission system B. As a result, node c is provided with communication functions to perform data communication in each of both transmission systems; the communication functions in the IEEE 1394 and the communication functions in, for example, the infrared transmission system. Node c is also provided with communication functions capable in both transmission systems in order to realize real time data transmission between two different protocols. This communication function of node c is what this embodiment aims at. Node c is configured to function, as a device for connecting networks.

In FIG. 2, a concrete circuit configuration of node c, the apparatus for connecting networks, is illustrated.

As shown in FIG. 2, in node c, a communicating part 1 for transmission system A is incorporated as a first communicating means. The communicating part 1 for transmission system A has the IEEE 1394 communication function to communicate in the network system connected with a transmission system of IEEE 1394 (the transmission system A), and by using this communication function, data communication based on the IEEE 1394 system becomes possible. That is, among the devices connected by IEEE 1394, besides data transmission at high rate becoming possible, node ID, which is necessary for assigning devices to make them perform data transmission, is automatically allocated. Also the network configuration is automatically determined.

Node c, as stated above, is further provided with a communicating part 2 for transmission system B as a second communicating means to communicate among devices connected to the radio network (the transmission system B) which is a different protocol. That is, the communicating part 2 for transmission system B 2 has functions required for data communication based on the radio transmission system. Thus, node c uses the infrared transmission configuration of the transmission system B as well as devices connected to the IEEE 1394 network to enable data communication with the devices connected with the transmission system B by network connection.

Furthermore, in node c, which is configured in accordance with this embodiment of the present invention, a communication capability informing part 3 is provided as shown in the figure. This communication capability informing part 3 generates information to inform the other nodes a and b in the IEEE 1394 network that node c has the communication function to communicate with the radio network, and supplies the information to the communicating part 1 for transmission system A. When other nodes, node a and node b, receive this information, node a and node b can recognize that node c has the function to communicate with the radio network.

A transmission rate informing part 4 detects the maximum transmission rate which the radio network can transmit from the radio transmission function of the communicating part 2 for transmission system B, or detects the size of data transmissible at a time, and informs node a and node b in the IEEE 1394 network of the detected results. In this way, all the nodes connected to the IEEE 1394 network, including node c, recognize the maximum transmission rate in the radio transmission system, the transmission system B.

When node c actually performs data transmission to node d of the transmission system B which is a different protocol, the data received through the communicating part 1 for transmission system A are supplied to each of a communication procedure converting part 5 and the signaling type converting part 6. That is, the communication procedure converting part 5, after the process of converting the communication data of the IEEE 1394 into a suitable communication procedure for the radio network, supplies the data to the communicating part 2 for transmission system B. The signaling type converting part 6, after the process of converting the supplied data from the signaling type of the IEEE 1394 communication data (e.g., the format of packet) into a suitable format for communication data in the radio network, supplies the data to the communicating part 2 for transmission system B.

Therefore, conversion of the IEEE 1394 communication data, by the communication procedure converting part 5 and the signaling type converting part 6, into the signaling type and the format suitable for data transmission in the radio transmission system makes data transmission possible for node d, which is connected to the radio network, by way of the communicating part 2 for transmission system B.

Next, a detailed description will be given on the operation of the apparatus for connecting networks shown in FIG. 2 with reference to FIG. 3. In this embodiment of the present invention, data communication from the IEEE 1394 network to the radio network will be described.

First, the procedure to connect the radio network to the IEEE 1394 network is discussed. As shown in FIG. 3, on the IEEE 1394 network side, to begin with, the IEEE 1394 communication function of the communicating part 1 for transmission system A reconstructs the bus on every occasion such as the throwing-in of power source or occurrence of an increase/decrease of nodes at the time of connecting/disconnecting nodes, and determines the bus configuration. That is, in a plurality of devices, the node ID of each node and the root node are determined. Then, out of a plurality of nodes a, b, and c one node becomes the bus manager. In this example, node c is assigned as the bus manager.

After that, node c, as bus manager, performs necessary preparation for data communication according to the procedure based on the IEEE 1394 Standard to get in functional condition.

Meanwhile, on the radio network side, node d is connected with node c, through the radio transmission system B and the communicating part 2 for transmission system B in node c in the IEEE 1394 network. Consequently, node d and node c are connected as a radio network by the radio communication function provided in the communicating part 2 for transmission system B in node c, and at the same time, get into functioning condition as a radio network (step S1, step S2).

At this time, the network function of node c makes nodes a and b in the IEEE 1394 network (or all nodes that manage and control the IEEE 1394 network, though not shown in the figure, in case a plurality of nodes are provided in addition to nodes a and b) recognize, through the communication capability informing part 3, that node c has the function to communicate with the radio network (step S3). Simultaneously, node c makes nodes a and b (or all nodes that manage and control the IEEE 1394 network) recognize, through the transmission rate informing part 4, the maximum transmission rate, which is transmissible by the radio network, or the size of data which can be transmitted at a time (step S4).

With the operations stated above, each node in the IEEE 1394 network, shown in FIG. 1, recognizes the maximum transmission rate of the radio network and completes the preparation for data communication with node d in the radio network. In this case, data communication with the radio network must be performed through node c.

Now, suppose data communication is performed from node a or node b for node d. Node a or node b outputs the communication data based on the recognized transmission rate. The communication data directed to node d from node a or node b is received as communication data of the IEEE 1394 by the communicating part 1 for transmission system A of node c through the IEEE 1394 transmission system.

After that, the communication data of the IEEE 1394, which is received by the communicating part 1 for transmission system A (the communication function of the IEEE 1394 ), is converted into the communication procedure suitable for the radio network by the communication procedure converting part 5, and is converted by a signaling type converting part 6 into the format suitable for communication data of the radio network from the packet format of the IEEE 1394 communication data (step S5, step S6).

Specifically, generation of signals for start/termination of communication or conversion is performed at the communication procedure converting part 5, and generation or conversion of values to be stored in the packet header or conversion of packet format is done at the signaling type converting part 6.

Then, the communication data, after being converted by the communication procedure converting part 5 and the signaling type converting part 6 into the packet format and the communication procedure suitable for the radio network, are sent by the communicating part 2 for transmission system B, then, transmitted to and received by node d in the radio network through the radio transmission system (step S7).

Thus, it becomes possible to perform real time data transmission from the nodes in the IEEE 1394 network, through the radio transmission system, to the nodes in the radio network of a different protocol.

Although the description in this example is given only in transmitting communication data from the nodes in the IEEE 1394 network to the nodes in the radio network, a reverse case can also be dealt with. That is, the procedure to enable transmission of communication data from the nodes in the radio network to the nodes in the IEEE 1394 network is: replacing the transmission system A for the radio network, the transmission system B for the IEEE 1394 network, and node c performing the communication procedure converting process and the signaling type converting process. Data communication becomes possible as described above.

Therefore, according to this embodiment of the present invention, the nodes to perform data communication in the IEEE 1394 network are able to recognize the maximum transmission rate in the radio transmission system by being informed by the transmission rate informing part 4 of node c. Thus, the nodes to perform data communication can transmit data at the rate based on the maximum rate recognized. Even if some data in the IEEE 1394 are sent, the communication procedure converting part 5 and the signaling type converting part 6 of node c, the bus manager, convert the communication data of the IEEE 1394 into the communication procedure and the data format both suitable for the radio transmission configuration to enable isochronous transmission by the protocol based on the radio transmission system. As a result, even in a network system connected to different protocols, real time data communication becomes possible.

Now, in the embodiment of the present invention, it is described that the data communication from the IEEE 1394 network to the radio network is possible. With the apparatus for connecting networks which is configured in accordance with the present invention, two-way and real time data communication is also possible. Such an embodiment of the present invention is illustrated in FIG. 4.

Figure 4:
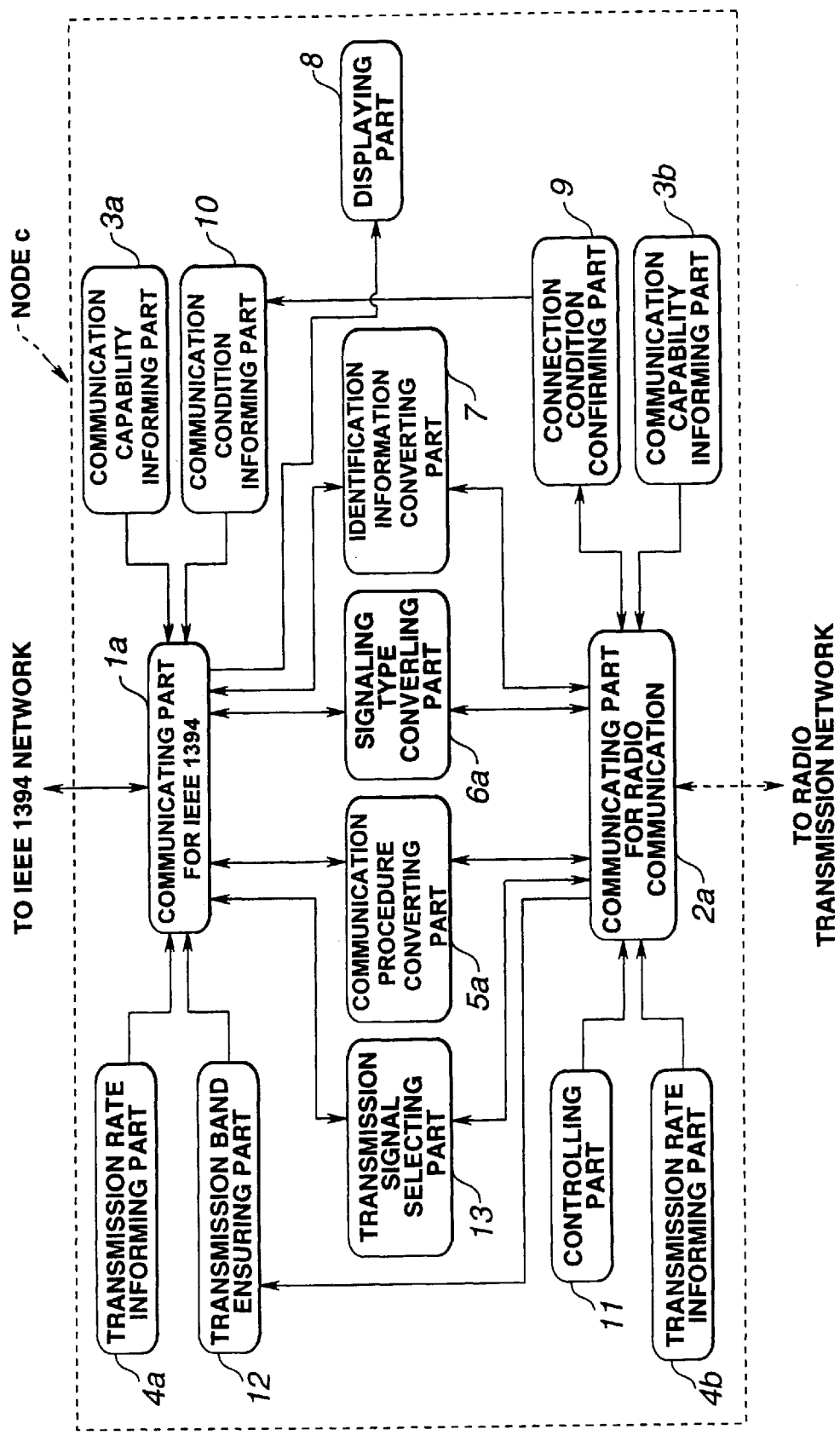
FIG. 4 is a block diagram showing another embodiment of an apparatus for connecting networks according to the present invention.

FIG. 4 shows another embodiment of the present invention on the apparatus for connecting networks. This figure is a block diagram that illustrates a concrete circuit configuration of node c as the apparatus for connecting networks.

In this embodiment of the present invention, node c has been improved. In addition to the components of node c, the configuration of node c has been provided with the transmission rate informing part 4b, the communication capability informing part 3b, the identification information converting part 7, the displaying part 8, the connection condition confirming part 9, the connection condition confirming part 10, the controlling part 11, the transmission band ensuring part 12, and the transmission signal selecting part 13. Thus, this node c has enabled two-way data communication. This is the point which differs from the embodiment of the present invention.

As shown in FIG. 4, a communicating part 1a for IEEE 1394 is almost the same as the communicating part 1 for transmission system A in FIG. 2. That is, it has the communication function to meet the IEEE 1394 Standard. A communicating part 2a for radio communication is also almost the same as the communicating part 2 for transmission system B shown in FIG. 2, with the radio communication function.

Although a transmission rate informing part 4a operates in a similar manner to the transmission rate informing part 4 shown in FIG. 2, another transmission rate informing part 4b, contrary to the above, informs each node in the radio network or those nodes that manage and control the radio network of the transmission rate of the IEEE 1394 network.

Similarly, while a communication capability informing part 3a operates in similar manner to the communication capability informing part 3 shown in FIG. 2, another communication capability informing part 3b informs each node in the radio network or nodes to manage and control the radio network of the information that it has a function to communicate with the IEEE 1394 network.

A communication procedure converting part 5a processes the supplied data to convert the communication procedure of the IEEE 1394 network and the communication procedure of the radio network mutually, and a signaling type converting part 6a processes the supplied data to perform the mutual conversion of the signaling type of the IEEE 1394 network and the signaling type of the radio network, and outputs. With these functions, even when communication data of either of the IEEE 1394 or the radio transmission system is supplied, the data are converted into the communication data suitable for the transmission configuration to transmit to.

As for the identification information converting part 7, it operates so as to convert mutually the identification information of the IEEE 1394 network (in the IEEE 1394, the bus ID, or the node ID of each node, or the address including these) and the identification information of the radio network. With this operation, even when data communication is performed to a different protocol, owing to conversion of identification information, the part where data are transmitted to or from becomes recognizable.

The displaying part 8 is a displaying means to inform users of the establishment of connection between the IEEE 1394 network and the radio network, being composed of, for example, the liquid crystal displaying part or LED and the like. For instance, with displaying the connecting condition between the IEEE 1394 network and the radio network on the displaying part 8, users can instantly recognize the connecting condition. In case a device provided with the displaying function is connected in the IEEE 1394 network, the configuration may be formed to have the display outputting part 8 (not shown in the figure) output display data based on the connecting condition onto the device which is provided with the displaying function. In this way, users can recognize the data without display on the displaying part 8.

The connection condition confirming part 9, a newly provided part, is to confirm whether communication is possible, that is, whether node d (refer to FIG. 1) in the radio network, to which node c is connected, is connected, then, supplies the confirmed results to the connection condition confirming part 10.

The connection condition confirming part 10 when the connection condition confirming part has confirmed the connecting condition, informs each node in the IEEE 1394 network or those nodes that manage and control the IEEE 1394 network of whether the connection of node d in the radio network is maintained. When the connection of node d is maintained, data communication to the radio network becomes possible.

In the apparatus for connecting networks in this embodiment of the present invention, node c, which is connected to the IEEE 1394 network, is provided with a controlling part 11 to manage and control the whole radio network. With this, node c is able to manage ID for all the nodes in the radio network and to control ID allocation and the like necessary for data communication.

The transmission band ensuring part 12, when the IEEE 1394 network performs isochronous transmission, ensures the channels of transmission band as channel numbers required by each node d in the radio network.

Suppose that one party of the communication network is the IEEE 1394 network, wherein isochronous signals for transmission are divided into five channels, the channels A, B, C, D and E, with transmission bands of 20 Mbps, 5 Mbps, 10 Mbps, 3 Mbps and 15 Mbps respectively. Suppose the other party of the communication network is the radio network, wherein the maximum transmission rate is, for example, 8 Mbps. Consequently, out of five channels (A to E) transmitted in the IEEE 1394, only the channel B and the channel D are able to be transmitted to the radio network. A transmission band ensuring part 12 ensures only the signals of the channels B and D which are in the range of transmission band of the radio network, the other protocol. A transmission signal selecting part 13 selects the channels required by the radio network out of channels (band) ensured by this transmission band ensuring part 12, then, transmits them to the radio network.

Thus, the transmission signal selecting part 13 selects only transmission signals based on the channel numbers ensured by the transmission band ensuring part 12 (isochronous packets from the IEEE 1394 network), then, transmits them to the radio network. When the data transmission is not directed to the radio network but to a network of other transmission system, the transmission band ensuring part 12 and the transmission signal selecting part 13 can select channels to meet the range of transmission band of the other network, and transmit data through selected channels. This enables isochronous transmission of data only which are necessary for data communication.

Although this transmission band ensuring part 12 is originally a means to perform isochronous resource management function (the IEEE 1394 Standard) to ensure the total transmission rate within the range of the maximum transmission rate in allocation of transmission band to each channel in IEEE 1394, it may also be used to perform transmission band ensuring function for the transmission of different protocols.

Next, the operation of the apparatus for connecting networks shown in FIG. 4 will be described in detail with reference to FIG. 5.

Figure 5:
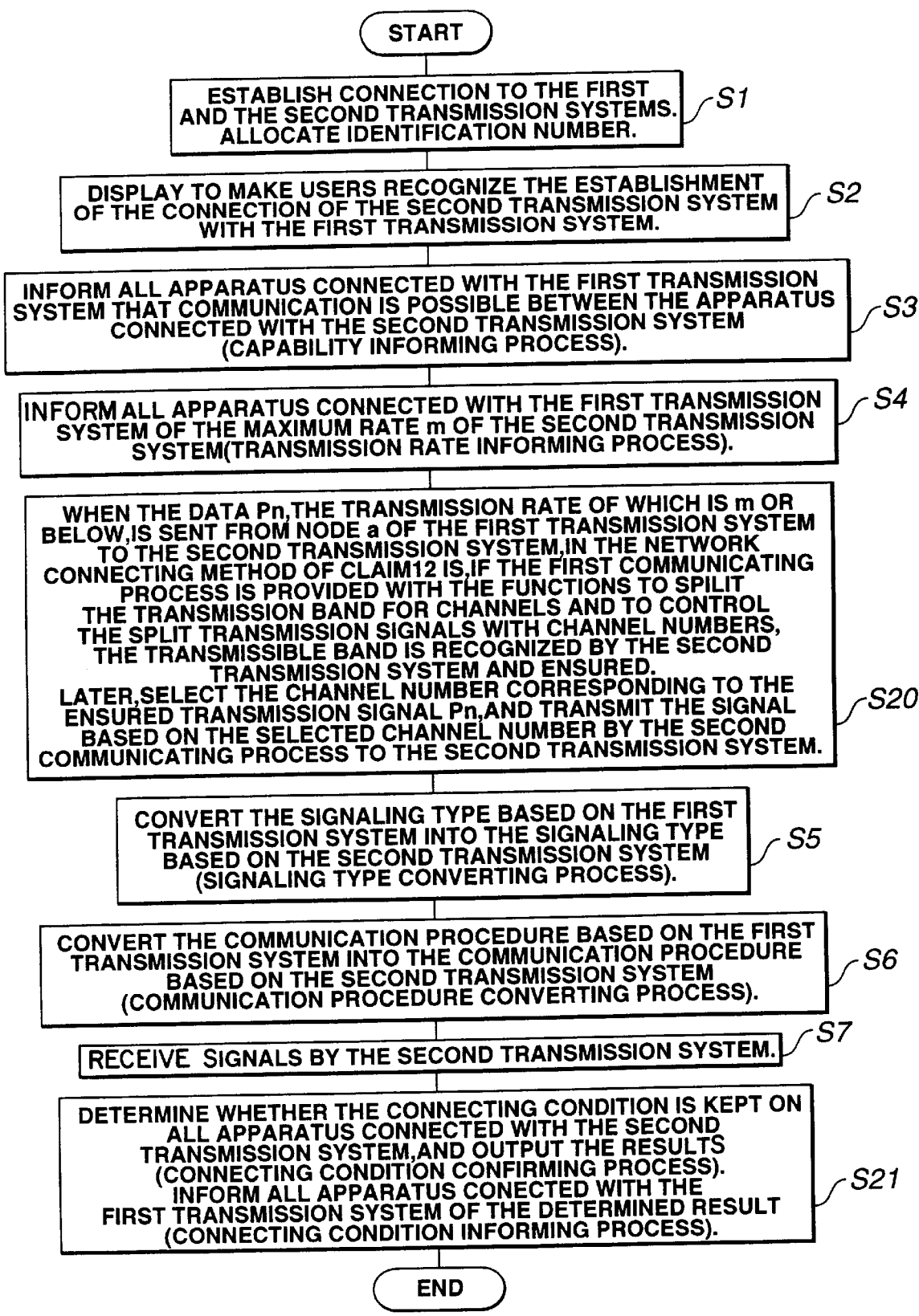
FIG. 5 is a flow chart showing a method of connecting networks by using an apparatus for connecting networks shown in FIG. 4.

FIG. 5 is a flow chart showing an example of controlling operation in the apparatus for connecting networks. As for the similar processes to the ones shown in FIG. 3, the description about them in FIG. 5 is marked with the same symbols as in FIG. 3 and omitted. Also, each node, including node c in FIG. 4, is regarded, similarly similar to the embodiment of the present invention, to be connected in the same manner as shown in FIG. 1.

First of all, in order to make a system that is configured by connecting the IEEE 1394 network with the radio network transmissible, as shown in FIG. 5, in a similar manner to the embodiment of the present invention, on the side of the IEEE 1394 network, the bus is configured by the IEEE 1394 communicating function provided in the communicating part for IEEE 1394 1a every time the power source is turned on or there is an increase/decrease of nodes while connecting/disconnecting them, and the bus configuration is determined. In other words, in a plurality of devices, the node ID of each node and the root node are determined. Further, one node out of a plurality of nodes a, b and c becomes the bus manager. In this example, again, node c is designed to become the bus manager.

After that, node c, as bus manager, performs preparations necessary for data communication according to the procedure based on the IEEE 1394 Standard, and starts functioning as the IEEE 1394 network.

On the side of the radio network, node d is connected to node c through the radio transmission system B and the communicating part for radio communication 2a of node c in the IEEE 1394 network. Consequently, node d and node c are in a connected condition as a radio network by the radio communication function of the communicating part for radio communication 2a of node c, and at the same time, they are in the functioning condition as a radio network (step S1, step S2).

At this time, the network function of node c makes each of nodes a and b or the nodes to manage and control the IEEE 1394 network (though not shown in the figure, in case a plurality of nodes are provided besides nodes a and b) recognize through the communication capability informing part 3a that node c has the function to communicate with the radio network (step S3). At the same time, node c makes each of nodes a and b or those nodes that manage and control the IEEE 1394 network recognize, through the transmission rate informing part 4a, the maximum transmission rate transmissible for the radio network or the size of data transmissible at a time (step S4).

Similarly, to the radio network, the communication capability informing part 3b informs each node in the radio network that node c has the function to mediate communication with the IEEE 1394 network, and the transmission rate informing part 4b informs the transmission rate transmissible for the IEEE 1394 network or the size of data transmissible at a time, making the radio network side recognize these.

As for the identification information (the bus ID and the node ID in the IEEE 1394) to identify each node in the IEEE 1394 network and the radio network held by the functions of the communicating part for IEEE 1394 1a and the communicating part for the radio communication 2a respectively, it is converted by an identification information converting part 7 into the identification information suitable for each network, then, transferred. Thus, the identification information on nodes in each other's networks is shared. After that, each node obtains information to identify the party to communicate with after the procedure prescribed in each network.

Further, node c, because it has the controlling part 11 to manage and control the whole radio network, becomes the node that manages and controls the whole radio network following the procedure prescribed in the radio network. Each node in the radio network is informed, through the communicating part for radio communication 2a, that node c is the node to manage and control the radio network. Thus, each node in the radio network is able to recognize that node c is the bus manager in the radio network.

When the radio network has the function to perform synchronous transfer (isochronous transfer in the IEEE 1394 ), it is designed to get the transmission band of the IEEE 1394 network divided by the difference in transmission band into each channel, the divided channels ensured as channel numbers, then, in order to perform data transmission in a prescribed range of transmission band responding to requests from the radio network, a channel number based on the transmission band transmissible into the radio network selected by the transmission signal selecting part 13 out of ensured channel numbers (step S20).

With the operation described above, the preparation for performing asynchronous/synchronous transmission between the radio network and the IEEE 1394 network is completed.

In order to ensure data transmission, reconfirmation of the connecting condition between the IEEE 1394 network and the radio network is required. In this embodiment of the present invention, a connection condition confirming part 9 (shown in FIG. 3) confirms regularly or always whether node d in the radio network (refer to FIG. 1) is connected to node c in the IEEE 1394 network (refer to FIG. 1).

As a concrete method of confirming the connecting condition, there is, for example, monitoring the carrier from node d by the communicating part for radio communication 2a. If the signal level gets low or is not receivable, this method determines that node d has gotten in the non-connected condition from the connected condition. Another possible method to determine the connection confirmation is to emit the connection confirming signal for node d at regular intervals through the communicating part for radio communication 2a, and to obtain the response to the connection confirming signal returned from node d. Consequently, the connection condition confirming part 9 confirms the connecting condition of node d by applying such confirming methods (step S21). As for the connection confirming work by the connection condition confirming part 9, it may be configured to confirm the connection, for example, before data communication and so as not to perform the connection confirming work during the period of data communication.

The information on the connecting condition, which is confirmed in the way described above, is sent by a connection condition confirming part 10 to each node in the IEEE 1394 network (in FIG. 1, node a, node b) through the communicating part for IEEE 1394 1a. In the case of an increase/decrease of nodes, except node d, in the radio network, after such an increase/decrease of nodes, the connection condition confirming part 9 confirms the increase or decrease of nodes, and the information is sent to each node in the IEEE 1394 network in a similar manner. When an increase/decrease of nodes arises in the radio network, the IEEE 1394 network may issue the bus reset and reconstruct the bus. Otherwise, if the IEEE 1394 network does not issue the bus reset and reconstruct the bus, the configuration may be designed so as to change the correspondence of identification information to convert at the identification information converting part 7 in the network device.

Then, when the preparation for the signal transmission between the IEEE 1394 network and the radio network is finished, a displaying part 8 provided in node c displays that the preparation is completed, and with this, users become able to recognize it.

Next, a description will be given of two methods of performing asynchronous transmission and synchronous transmission (isochronous transfer) when, by using a similar network connecting configuration (refer to FIG. 1), signals are transmitted from node a in the IEEE 1394 network to node d in the radio network.

First, an asynchronous transmission will be described. When the IEEE 1394 network and the radio network are ready for signal transmission as stated above, node a (suppose the bus ID=0, the node ID=0) designates node d (suppose the bus ID=1, the node ID=0) as the destination and emits the data to transmit, which have been stored in a packet in conformity with the format prescribed by the IEEE 1394 network. The packet emitted from node a (since the data are transmitted from a to d, they will be referred to as, for example, the packet ad) is received, through node b, by the communicating part for IEEE 1394 1a of node c.

Then, the packet ad received by the communicating part for IEEE 1394 1a has its packet configuration terminated and sent to the communication procedure converting part 5a, to the signaling type converting part 6a, and to the identification information converting part 7. At this time, the communication procedure converting part 5a generates signals, which are required for processing the procedure necessary for sending signals in the radio network from node c to node d. The signaling type converting part 6a converts the information and data, which have been stored in the packet ad, into the format required by the radio network, and at the same time, adds information, if there is any information needed for the radio network but not needed for the IEEE 1394 network (step S5, step S6).

At the identification information converting part 7, the identification information in node d, from the standpoint of the IEEE 1394 network which is designated as the destination of the packet ad, i.e., the information (such as the bus ID=1, the node ID=0) is converted into the identification information held by node d as a node in the radio network (e.g., ID=2). Concretely, the conversion to be done is; conversion of number of bits (e.g., in the IEEE 1394, 10 bits for the bus ID and 6 bits for the node ID makes 16 bits, and this 16 bits should be converted to 10 bits for the radio network), addition/deletion of offset address (e.g., deletion of the bus ID of the IEEE 1394 as offset address), preparation of a list of the identification information on nodes in both networks, and conversion based on the list.

Thus, the packet ad, after being converted by the communication procedure converting part 5a, the signaling type converting part 6a and the identification information converting part 7 into the format, procedure and identification information suitable for the radio network, is sent as the packet ad' to node d by way of the communicating part for radio communication 2a.

At this stage, if node d, which has received the packet ad', needs to return some response (hereinafter referred to as ACK) to node a according to the communication procedure in the radio network, the ACK emitted from node d beaming to node a (in this case, named ACK da) is received at the communicating part for radio communication 2a of node c, then, supplied to the communication procedure converting part 5a, the signaling type converting part 6a, and the identification information converting part 7. After that, ACK da, being supplied to the communication procedure converting part 5a, the signaling type converting part 6a, and the identification information converting part 7, undergoes a reverse process of the conversion of the packet ad into the packet ad'; conversion into the format, procedure and the identification information suitable for the IEEE 1394 network.

At this time, if there is any difference in the code of ACK between the IEEE 1394 network and the radio network (for example, while the code to indicate normal receiving at node d is 0, the expected value indicated by ACK as normal receiving at node a is 1), the signaling type converting part 6a decodes the code of ACK da sent from node d, and converts it into a code which has the same meaning for node a. The converted ACK da is emitted as ACK da' by the communicating part for IEEE 1394 1a for node a. In this example, the response from node d to the received data is described. In the case when node a, for example, requests node d to communicate some data again, the answering packet from node d to node a (hereinafter referred to as the packet da) is given a similar process to the case of ACK da in node c, and emitted as the packet da' from node c to node a. The transmission of a packet from node d to node a is also performed by similar operations.

This enables asynchronous data communication from node a to node d which is securely connected to a different protocol.

Next, a case of isochronous transfer will be discussed.

The radio network in this example will be described assuming that it has the similar transmission function to the IEEE 1394 network, that is, it is a network with the mode which can perform isochronous transmission. Also, sending/receiving data will be discussed on the case when it is performed through transmission signals which have some identification information to identify packets to be received by nodes in the radio network (hereinafter referred to as the radio channel number).

The channel number ensured by the transmission band ensuring part 12 at request from the radio network, in other words, the channel number (suppose it as 3) which is supposed to be received by node d in the radio network, is acquired by node a in the method provided by the IEEE 1394 network, stored in an isochronous transmission packet (in this case, referred to as the Iso packet ad), and emitted to the IEEE 1394 network in a commensurate size to the transmission rate informed at the transmission rate informing part 4a.

After that, the Iso packet ad is received by the communicating part for IEEE 1394 1a of node c through node b. The received Iso packet ad has its packet configuration terminated, supplied, in a similar manner to the example of asynchronous transmission, to the communication procedure converting part 5a, the signaling type converting part 6a and to the identification information converting part 7 to undergo similar processes to the example of asynchronous transmission (step S5, step S6). However, in the Iso packet ad, the channel numbers are stored instead of the identification information to indicate the node of the destination (in the example of asynchronous transmission, the bus ID, or the node ID), and this channel number (in this example, 3) is converted by the identification information converting part 7 into a radio channel number in the radio transmission network (step S20).

The Iso packet ad, being thus converted into the format, procedure and identification information suitable for synchronous transmission in the radio network, is emitted as the Iso packet ad' through the communicating part for radio communication 2a to the radio network. Node d receives the Iso packet ad' in the procedure prescribed in the radio network, because the radio channel number of the Iso packet ad', which has been transmitted through the radio network, is the radio channel number to receive (step S7).

In the radio network, if returning some response is also required in isochronous transmission, the response packet from node d is received by the communicating part for radio communication 2a of node c, but is determined as unnecessary data for the IEEE 1394 network at the communication procedure converting part 5a. It means that the packet is not sent to node a.

In the next case described, sending/receiving of data is performed, not by identifying the radio channel number of the packet to receive for nodes in the radio network, but, in a similar manner to asynchronous transmission, by using the identification information of the node of destination (e.g., for node d, ID=2).

In this case, the channel number (similarly to above, 3) of the packet from the IEEE 1394 network (similarly to above, the Iso packet ad) needs conversion at the identification information converting part 7 into the identification information of the node (similarly to above, for node d, ID=2) which is to receive the packet in the radio network.

In one example of this method, node d sends a request-to-send for isochronous transmission data to node a, and node a, in response to it, informs node d of the channel number to be used, and through this series of procedures the correspondence is identified between the channel number of the Iso packet ad, which is emitted by node a, and ID=2 for node d which is receiving it. Another example of this method is to make a configuration so as to have a node which convergently manages channel numbers and the identification information of nodes to send to/to receive from, and an inquiry to the node gives the correspondence between the channel numbers and the identification information of nodes in the radio network.

Then, the channel number 3 is converted to ID=2 of node d, the node of destination, and the Iso packet ad, being converted into the format, procedure and identification information suitable for synchronous transmission in the radio network, is emitted as the Iso packet ad', through the communicating part for radio communication 2a, to the radio network similarly to the embodiment of the present invention. On the other side, node d receives the Iso packet ad' in the method prescribed in the radio network.

As described above, this embodiment brings about not only the effects similar to the embodiment, but also enables data communication, which node a to node c in the IEEE 1394 network perform regardless of whether the other transmission system is IEEE 1394 or of the radio transmission system of different protocol.

In the IEEE 1394 network, including the apparatus for connecting networks which is configured in accordance with the present invention, each node is informed of the maximum transmission rate of the transmission system of a different protocol (the radio system) by the transmission rate informing part 4 (refer to FIG. 2) or the transmission rate informing part 4a (refer to FIG. 3) in node c, and the data can be transmitted in a size based on the maximum rate informed. That is, to the apparatus for connecting networks (node c), which performs data transmission to the radio network, data is supplied being divided into the size based on the maximum transmission rate. With this, node c can transmit data to the radio network in the minimum buffer memory size and real time. Such an embodiment of this is shown in FIG. 6.

Figure 6:
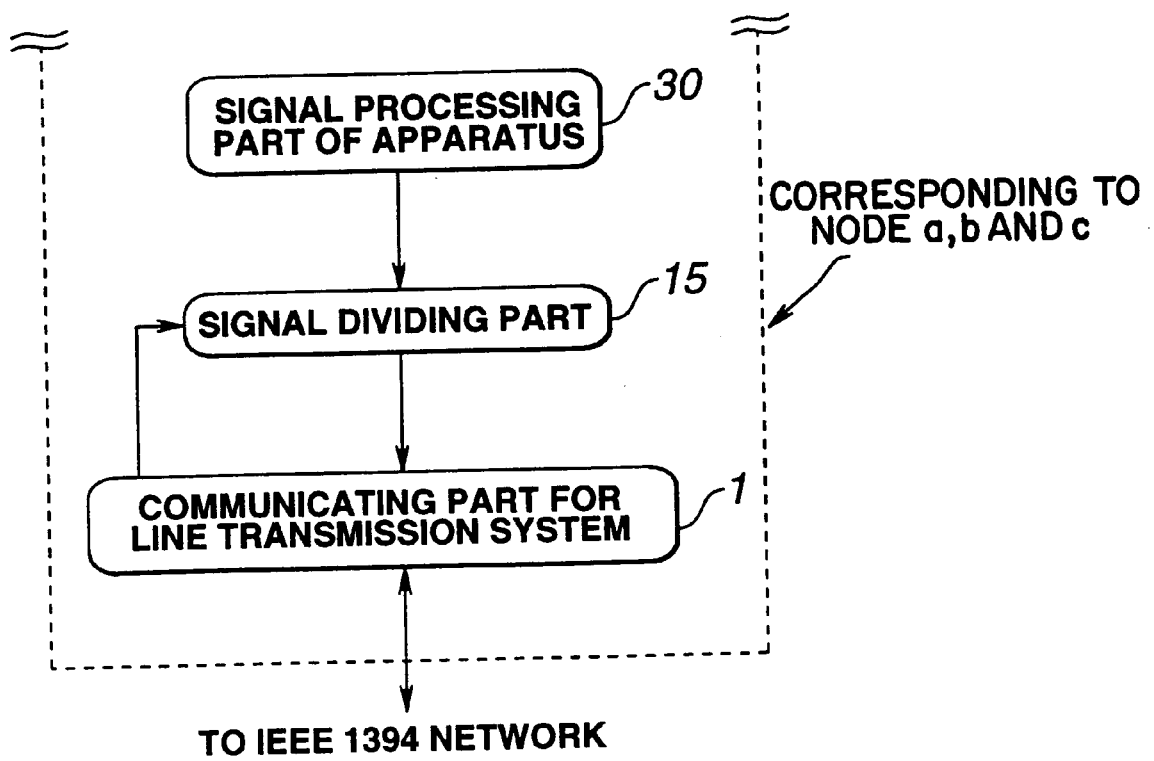
FIG. 6 is a block diagram showing nodes of devices connected to the IEEE 1394 network.

FIG. 6 is a block diagram illustrating the configuration of the principal part of each digital interface provided in node a to node c in the IEEE 1394 network (refer to FIG. 1).

As shown in FIG. 6, a signal processing part 30 is provided in each device of node a to node c. In other words, these signal processing part 30 perform signal processing required for data communication, then, supply the data to the signal dividing part 15.

A signal dividing part 15 divides the data to transmit from the signal processing part 30 into the size corresponding to the maximum transmission rate in the radio network, which has been informed by the transmission rate informing part 4 in FIG. 2 or by the trans mission rate informing part 4a in FIG. 4, then, supplies the data through the IEEE 1394 network to the communicating part 1 for the line transmission system (it operates similarly to the communicating part for the transmission system A shown in FIG. 2). With this, the data can be transmitted to the radio network in the minimum size of buffer memory provided in node c, and moreover, in the condition as they are and in real time.

One example of this will be described with reference to FIG. 7.

Figure 7:
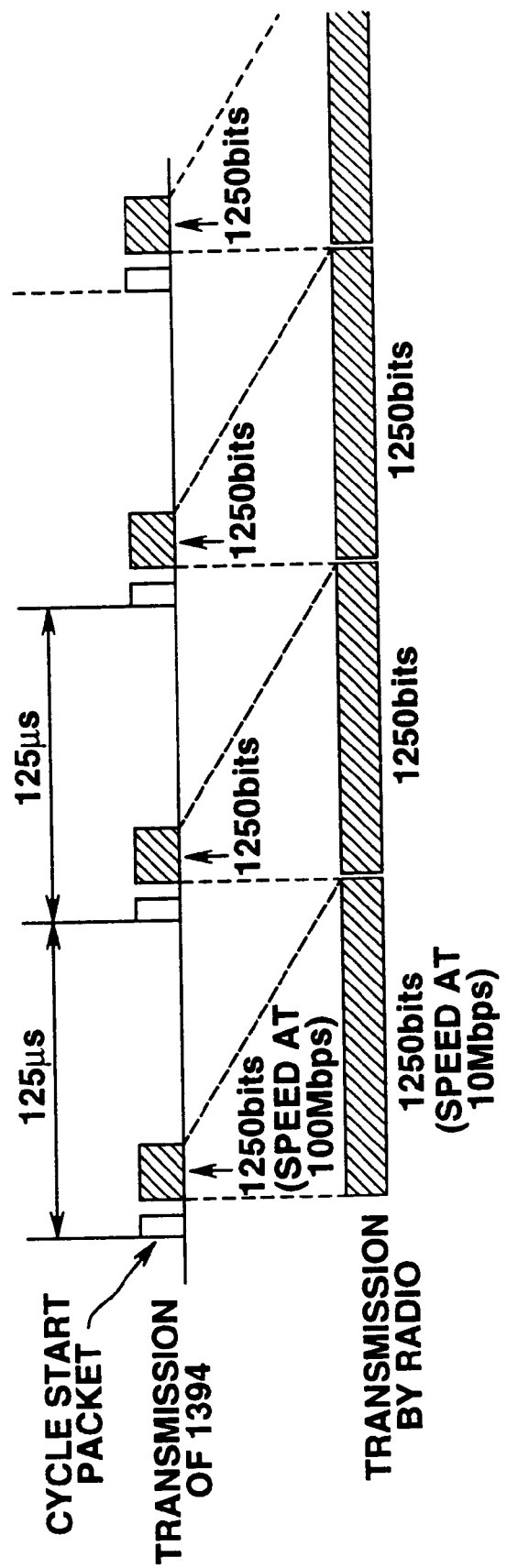
FIG. 7 is an explanatory drawing for explaining the transmission condition between the IEEE 1394 transmission system and the radio transmission system.

FIG. 7 is an explanatory drawing illustrating data transmission between the IEEE 1394 network and the radio network.

Suppose an example, as shown in FIG. 7, with the radio transmission system which can transmit at 10 Mbps, and with a channel whose signal is 10 Mbps. The channel is in the IEEE 1394 transmission system with the speed of 100 Mbps. The concept to send the channel to a node in the radio transmission system is as follows:

For instance, when 10 Mbps is sent on the isochronous cycle of the IEEE 1394 (in the figure, shown as the cycle start packet) at every 125 μs, it is possible to send it optionally divided. For example, at a first and a second cycles 1250/2 bits each are sent, and from a third to tenth cycles nothing is sent. Even though this pattern is repeated cyclically, sending at 10 Mbps is possible. However, such unbalanced dividing requires buffer in order to transmit to the radio system. Accordingly, dividing equally minimizes the buffer size. Transmission on the IEEE 1394 in the size divided for every 1250 bits per cycle enables, as shown in FIG. 7, to minimize the buffer size for conversion of the IEEE 1394 protocol into the radio protocol.

In this embodiment, suppose that signals are sent from node a to node d shown in FIG. 1. As stated above, when the preparation in the IEEE 1394 network and the radio network is completed, and when asynchronous or synchronous transmission is performed, the data from the signal processing part 30 of the device are divided into the maximum size of signals to be transmitted by the radio network, the size recognized through information from the transmission rate informing part 4 (or the transmission rate informing part 4a), then, are transmitted, being as they are, to the IEEE 1394 network by the communicating part 1 for the IEEE 1394. Thus, the data are divided into the maximum size in the radio network, and the signals are transmitted through node c and the radio transmission system to node d in the radio network.

Consequently, with this embodiment, even when two different protocols are connected, the signal dividing part 15 divides the data to transmit into the size based on the maximum transmission rate of the radio transmission system, and transmits them, enabling real time data transmission in both of the IEEE 1394 network and the radio network. Further, in addition to the isochronous transmission utilizing the advantages of the IEEE 1394, any data required become transmissible by adding the data to the divided data.

While the present invention has been described above with respect to embodiments thereof, wherein an example described is of data transmission between the IEEE 1394 network and the radio network, it should be understood that the present invention should not be limited only to the networks but may also be applied to configure a network which is connected by two different protocols, whether wire or wireless. Even in this case, the same advantages as in the embodiments are available.

It is obvious that the present invention is, without any departure from the spirit and scope of it, able to become the basis of configuration for different aspects of embodiments in a wide scope. The present invention should not be limited, except by the appended claims, only to these embodiments.

What is claimed is:

1. An apparatus for connecting networks, comprising:

a communicating means for communicating in either protocol of first and second transmission systems whose protocols are different;

a communication capability informing means for informing a device connected with at least one of said first and second transmission systems that communication is possible with a device connected with the other transmission system;

a transmission rate informing means for informing the device connected with the other transmission system of the transmission rate based on at least one of said first and second transmission systems;

a communication procedure converting means for converting a communication procedure based on at least one of said first and second transmission systems into the communication procedure based on the other transmission system; and a signaling type converting means for converting the signaling type based on at least one of said first and second transmission systems into a signaling type based on the other transmission system.

2. An apparatus for connecting networks, comprising:

a first communicating means having, when a plurality of devices are connected with each other by a predetermined topology through a first transmission system, a function to perform communication with said plurality of devices connected with said first transmission system;

a second communicating means having, when a plurality of devices are connected with a second first transmission system, a function to perform communication devices connected with said second transmission system;

a communication capability informing means for informing, through said first communicating means, all the devices connected with said first transmission system that communication is possible with the devices connected with said second transmission system;

a transmission rate informing means for informing, through said first communicating means, all the devices connected with said first transmission system of the maximum transmission rate of said second transmission system;

a communication procedure converting means for converting a communication procedure based on said first transmission system into the communication procedure based on said second transmission system; and a signaling type converting means for converting the signaling type based on said first transmission system into a signaling based on said second transmission system.

3. An apparatus for connecting networks, comprising:
- a communicating means for communicating in either protocol of first and second transmission systems whose protocols are different;
- a communication capability informing means for informing a device connected with both of said first and second transmission systems that communication is possible with a device connected with at least one of said first and second transmission systems;
- a transmission rate informing means for informing the device connected with both of said first and second transmission systems of the transmission rate based on at least one of said first and second transmission systems;
- a communication procedure converting means for converting communication procedures based on said first and second transmission systems respectively to each other; and
- a signaling type converting means for converting signaling types based on said first and second transmission systems respectively to each other.

4. An apparatus for connecting networks, comprising:
- a first communicating means having, when a plurality of devices are connected with each other by a predetermined topology through a first transmission system, a function to perform communication with said plurality of devices connected with said first transmission system;
- a second communicating means having, when a plurality of devices are connected with a second transmission system whose protocol is different from that of said first transmission system, a function to perform communication devices connected with said second transmission system;
- a communication capability informing means for informing, through said first communicating means and said second communicating means, all the devices connected with said first transmission system and all the devices connected with said second transmission system that communication is possible between the devices connected with said first transmission system and the devices connected with said second transmission system;
- a transmission rate informing means for informing, through said first communicating means and said second communicating means, all the devices connected with said first transmission system and all the devices connected with said second transmission system of the maximum transmission rate of said first transmission system and the maximum transmission rate of said second transmission system respectively;
- a communication procedure converting means for converting communication procedures based on said first and second transmission systems respectively to each other; and
- a signaling type converting means for converting signaling types based on said first and second transmission systems to each other.

5. An apparatus for connecting networks according to one of claims 1, 2, 3 or 4, comprising:
- an identification information converting means to mutually connect identification information of each device connected with said first transmission system and identification information of each device connected with said second transmission system.

6. An apparatus for connecting networks according to one of claims 1, 2, 3 or 4, comprising a connecting condition confirming means which is connected with said second communicating means to determine whether the connecting condition is maintained on all the devices connected with said second transmission system and to output the determined results using said second communicating means; and a connecting condition informing means for informing all the devices connected with said first transmission system of the determined results from said connecting condition confirming means.

7. An apparatus for connecting networks according to one of claim 6, comprising a displaying means for displaying the determined results from said connecting condition confirming means in order to make users recognize that the connection of said second transmission system is established with said first transmission system.

8. An apparatus for connecting networks according to one of claims 1, 2, 3 or 4, comprising a converting means for converting a controlling protocol employed in said first transmission system into a controlling protocol employed in said second transmission system.

9. An apparatus for connecting networks according to one of claims 1, 2, 3 or 4, comprising a transmission band ensuring means for ensuring the transmission band transmissible to said second transmission system and allocating channel numbers to said transmission band, and a transmission signal selecting means for selecting a channel number which corresponds to the transmission band ensured by said transmission band ensuring means and for transmitting a signal based on the selected channel number through said second communicating means to said second transmission system when said first communicating means has a function to divide the transmission band into channels and a function to manage these signals of divided transmission band using channel numbers.

10. An apparatus for connecting networks according to one of claims 1, 2, 3 or 4, comprising a transmission band ensuring means for dividing the transmission band to be transmissible to said second transmission system for re-packetting and allocating a channel number to each packet, and a transmission signal selecting means for selecting a channel number of a packet transmissible to said second transmission system among a plurality of packets adapted to re-packet by said transmission band ensuring means and transmitting the signal only of the packet of the selected channel number to said second transmission system through said second communicating means when said first communicating means has a function to divide the transmission band into channels and a function to manage these signals of divided transmission band using channel numbers.

11. An apparatus for connecting networks according to claim 9, wherein each of the devices for connecting in said first transmission system, which are connected with said second transmission system by said apparatus for connecting networks, is provided with a dividing means to divide signals to transmit into the signal size based on the transmission rate informed by said transmission rate informing means.

12. An apparatus for connecting networks according to claim 2, wherein either of said first and second transmission system is IEEE 1394 transmission system which is capable of isochronous transmission.

13. A method of connecting networks, comprising:
- a communication process communicating with either protocol of first and second transmission systems whose protocols are different;

a communication capability informing process of informing the devices connected with at least one of said first and second transmission systems that communication is possible with the devices connected with the other transmission system;

a transmission rate informing process of informing the devices connected with the other transmission system of the transmission rate which is based on at least one of said first and second transmission systems;

a communication procedure converting process of converting the communication procedure based on at least one of said first and second transmission systems into the communication procedure based on the other transmission system; and a signaling type converting process of converting the signaling type based on at least one of said first and second transmission systems into the signaling type based on the other transmission system.

14. A method of connecting networks, comprising:

a first communicating process for, when a plurality of devices are connected with each other by a prescribed topology through the first transmission system, performing communication between said plurality of devices connected with said first transmission system;

a second communicating process for, when a plurality of devices are connected with said second transmission system whose protocol is different from that of said first transmission system, performing communication between said plurality of devices connected with said second transmission system;

a communication capability informing process of informing all the devices connected with said first transmission system that communication is possible between devices connected with said second transmission system;

a transmission rate informing process of informing all the devices connected with said first transmission system of the maximum transmission rate of said second transmission system;

a communication procedure converting process of converting the communication procedure based on said first transmission system into the communication procedure based on said second transmission system; and a signaling type converting process of converting the signaling type based on said first transmission system into the signaling type based on said second transmission system.

15. A method of connecting networks, comprising:

a communication process communicating with either protocol of first and second transmission systems whose protocols are different;

a communication capability informing process of informing the devices connected with both of said first and second transmission systems that communication is possible with the devices connected with at least one of said first and second transmission systems;

a transmission rate informing process of informing the devices connected with both of said first and second transmission systems of the transmission rate which is based on at least one of said first and second transmission systems;

a communication procedure converting process of converting the communication procedures based on said first and second transmission systems respectively to each other; and a signaling type converting process of converting the signaling types based on said first and second transmission systems respectively to each other.

16. A method of connecting networks, comprising:

a first communicating process for, when a plurality of devices are connected with each other by a prescribed topology through the first transmission system, performing communication between said plurality of devices connected with said first transmission system;

a second communicating process for, when a plurality of devices are connected with said second transmission system whose protocol is different from that of said first transmission system, performing communication between said plurality of devices connected with said second transmission system;

a communication capability informing process of informing all the devices connected with said first transmission system and all the devices connected with said second transmission system that communication is possible between devices connected with said first transmission system and devices connected with said second transmission system using said first and second communicating processes;

a transmission rate informing process of informing all the devices connected with said first transmission system and all the devices connected with said second transmission system of the maximum transmission rate of said first transmission system and the maximum transmission rate of said second transmission system using said first and second communicating processes;

a communication procedure converting process of converting the communication procedure based on said first transmission system and the communication procedure based on said second transmission system to each other; and a signaling type converting process of converting the signaling type based on said first transmission system and the signaling type based on said second transmission system to each other.

17. A method of connecting networks according to one of claims 13 to 16, comprising:

a connecting condition confirming process for determining, through said second communicating process, whether connecting condition is maintained on all the devices connected with said second transmission system, and outputting the determined results; and a connecting condition informing process of informing all the devices connected with said first transmission system of the determined results from said connecting condition confirming process.

18. A method of connecting networks according to one of claim 17, comprising a displaying method to display the determined results from said connecting condition confirming process for making users recognize that connection of said second transmission system with said first transmission system is established.

19. A method of connecting networks according to one of claims 13 to 16, comprising a converting process of converting a controlling protocol employed in said first transmission system into a controlling protocol employed in said second transmission system.

20. A method of connecting networks according to one of claims 13 to 16, comprising a transmission band ensuring process for ensuring the transmission band transmissible to said second transmission system and allocating channel numbers to said transmission band, and a transmission signal selecting process for selecting a channel number which corresponds to the transmission band ensured by said transmission band ensuring process and for transmitting a signal based on the selected channel number through said second communicating process to said second transmission system when said first communicating process has a function to divide the transmission band into channels and a function to manage these signals of divided transmission band using channel numbers.

21. A method of connecting networks according to one of claims 13 to 16, comprising a transmission band ensuring process for dividing the transmission band to be transmissible to said second transmission system for re-packetting and allocating a channel number to each packet, and a transmission signal selecting process for selecting a channel number of a packet transmissible to said second transmission system among a plurality of packets adapted to re-packet by said transmission band ensuring process and transmitting the signal only of the packet of the selected channel number to said second transmission system through said second communicating means when said first communicating process has a function to divide the transmission band into channels and a function to manage these signals of divided transmission band using channel numbers.

22. A method of connecting networks according to claim 13, wherein each of the devices for connecting in said first transmission system, which are connected with said second transmission system by said method of connecting networks, is provided with a dividing process to divide signals to transmit into the signal size based on the transmission rate informed by said transmission rate informing process.

* * * * *